has been extended or adjusted under 35 U.S.C. 154(b) by 0 days.

United States Patent
Panikkar et al.

(10) Patent No.: US 11,693,932 B2
(45) Date of Patent: Jul. 4, 2023

(54) VENDOR SOFTWARE ACTIVATION USING DISTRIBUTED LEDGER

(71) Applicant: Dell Products L.P., Round Rock, TX (US)

(72) Inventors: Shibi Panikkar, Bangalore (IN); Murali Devendranath, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/979,877

(22) Filed: Nov. 3, 2022

(65) Prior Publication Data

US 2023/0104292 A1 Apr. 6, 2023

Related U.S. Application Data

(62) Division of application No. 16/783,679, filed on Feb. 6, 2020, now Pat. No. 11,526,585.

(51) Int. Cl.
| | |
|---|---|
| *H04L 29/06* | (2006.01) |
| *G06F 21/12* | (2013.01) |
| *G06F 21/73* | (2013.01) |
| *H04L 9/06* | (2006.01) |
| *H04L 9/00* | (2022.01) |

(52) U.S. Cl.
CPC .............. *G06F 21/12* (2013.01); *G06F 21/73* (2013.01); *H04L 9/0643* (2013.01); *G06F 2221/0768* (2013.01); *H04L 9/50* (2022.05)

(58) Field of Classification Search
None
See application file for complete search history.

(56) References Cited

U.S. PATENT DOCUMENTS

| | | |
|---|---|---|
| 11,210,372 B2 | 12/2021 | Savanah et al. |
| 11,294,991 B2 | 4/2022 | Savanah et al. |
| 2017/0134161 A1 | 5/2017 | Goeringer et al. |
| 2017/0206523 A1 | 7/2017 | Goeringer et al. |
| 2017/0221029 A1 | 8/2017 | Lund et al. |
| 2018/0203992 A1 | 7/2018 | Kilpatrick |
| 2018/0240165 A1 | 8/2018 | Kilpatrick |
| 2019/0303543 A1* | 10/2019 | Savanah ............... H04L 67/104 |
| 2020/0257775 A1 | 8/2020 | Wright et al. |
| 2021/0073211 A1 | 3/2021 | Wright, Sr. |
| 2021/0073407 A1 | 3/2021 | Yu et al. |

(Continued)

OTHER PUBLICATIONS

Satoshi Nakamoto, "Bitcoin: A Peer-to-Peer Electronic Cash System," http://bitcoin.org/bitcoin.pdf, 2008, 9 pages.

(Continued)

*Primary Examiner* — Jeffery L Williams
(74) *Attorney, Agent, or Firm* — Ryan, Mason & Lewis, LLP

(57) ABSTRACT

Techniques for managing activation of software, e.g., an operating system, in an information processing system are provided. For example, a method comprises the following steps. A data object is obtained for a system having an un-activated computer program stored thereon. The data object comprises information about the system encrypted by a private value. The method then causes the data object to be securely stored on a distributed ledger for subsequent access during a process to activate the computer program.

20 Claims, 6 Drawing Sheets

(56) References Cited

U.S. PATENT DOCUMENTS

2021/0248210 A1    8/2021    Panikkar et al.

OTHER PUBLICATIONS

J. Frankenfield, Investopedia, "Blockchain-as-a-Service (BaaS)," https://www.investopedia.com/terms/b/blockchainasaservice-baas.asp, May 17, 2018, 8 pages.
L. Fortney, Investopedia, "Blockchain Explained," https://www.investopedia.com/terms/b/blockchain.asp, Nov. 26, 2019, 23 pages.
Wikipedia, "Blockchain," https://en.wikipedia.org/wiki/Blockchain, Jan. 23, 2020, 19 pages.

* cited by examiner

VENDOR SOFTWARE ACTIVATION USING DISTRIBUTED LEDGER

RELATED APPLICATION(S)

The present application is a divisional of U.S. patent application Ser. No. 16/783,679, filed Feb. 6, 2020, and entitled "Vendor Software Activation Using Distributed Ledger," which is incorporated by reference herein in its entirety.

FIELD

The field relates generally to information processing systems, and more particularly to techniques for managing activation of software, e.g., an operating system, in such information processing systems.

BACKGROUND

An original equipment manufacturer (OEM) that sells a system that has third party software installed for use on the system (such as, but not limited to, an operating system) typically purchases a license key from the third party software provider that is fused in (permanently associated with) the system before it is sold to an OEM customer. The license key, which typically is a data string, is used by the third party software provider to verify authorized use of the software by the OEM customer before activating the software. For an OEM that delivers a large number of systems, the management of a large number of license keys presents significant challenges. By way of example only, license keys can be stolen or an error can occur in the license key management procedure such that when a legitimate OEM customer attempts to activate the software in the purchased system, an activation failure occurs resulting in inconvenience to the customer.

SUMMARY

Embodiments of the invention provide improved techniques for managing activation of software, e.g., an operating system, in an information processing system.

For example, in one illustrative embodiment, a method comprises the following steps. A data object is obtained for a system having an un-activated computer program stored thereon. The data object comprises information about the system encrypted by a private value. The method then causes the data object to be securely stored on a distributed ledger for subsequent access during a process to activate the computer program. By way of example only, this method can be performed by the OEM and/or by an entity that actually builds the system for the OEM, sometimes referred to as an original design manufacturer (ODM) or manufacturing factory.

By way of further example, in another illustrative embodiment, a method comprises the following steps. A private value and an identifier are received from a system having an un-activated computer program stored thereon. A data object corresponding to the identifier is obtained from a distributed ledger. The data object comprises information about the system encrypted by the private value. The method attempts to decrypt the data object using the private value, and activates the computer program for use by the system when the private value successfully decrypts the data object. By way of example only, this method can be performed by an entity associated with the computer program, e.g., a third party software provider or vendor.

In some embodiments, the information about the system may comprise one or more unique identifiers of the system. The one or more unique identifiers of the system may comprise one or more of a service tag and a serial number. In some embodiments, a service tag is a system identification alphanumeric value given by an OEM and a serial number is a system identification number given by an ODM. Further, the information about the system may comprise at least one of a version identifier of the un-activated computer program stored on the system and enabled features of the un-activated computer program stored on the system. The private value may be a hash value created from a set of unique identifiers of the system. The set of unique identifiers of the system may comprise a serial number of the system, a service tag for the system, and an identifier of a component in the system. The identifier of a component in the system may be an identifier of a motherboard installed in the system. The distributed ledger may be a blockchain network and the data object may be at least part of a transaction block. The computer program may be an operating system.

Advantageously, illustrative embodiments provide a keyless license activation process for an OEM-sold vendor operating system or software, with an access controlled activation hash on a blockchain. The systems and methodologies eliminate license keys and therefore the threat of theft of license keys, while maintaining security over the activation process. Also, there is no need for an OEM to maintain a dedicated business team to oversee license key procurement and management.

These and other features and advantages of the invention will become more readily apparent from the accompanying drawings and the following detailed description.

DETAILED DESCRIPTION

Illustrative embodiments will be described herein with reference to exemplary information processing systems and associated host devices, storage devices and other processing devices. It is to be appreciated, however, that embodiments are not necessarily restricted to use with the particular illustrative system and device configurations shown.

Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments.

Furthermore, some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or a computing system. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid cloud computing environment). A computing environment that comprises multiple cloud platforms (private clouds, public clouds, or a combination thereof) is referred to as a "multi-cloud computing environment."

Moreover, phrases "computing environment," "cloud environment," "cloud computing platform," "cloud infrastructure," "data repository," "data center," "data processing system," "computing system," "data storage system," "information processing system," and the like as used herein are intended to be broadly construed, so as to encompass, for example, any arrangement of one or more processing devices.

Illustrative embodiments provide a keyless license activation process that is based on a distributed ledger (e.g., blockchain) protocol. However, before describing illustrative embodiments, a typical license key management process for activation of vendor software in a computer system is described below in the context of FIG. 1.

Figure 1:
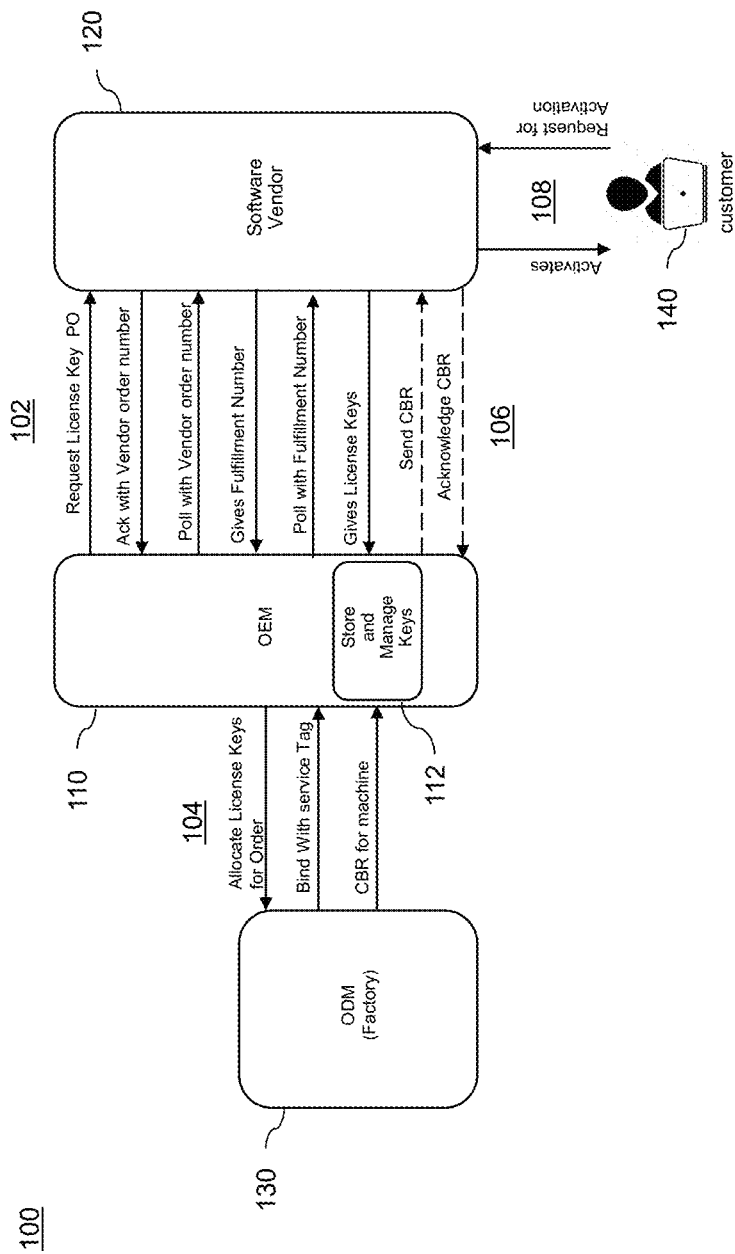
FIG. 1 depicts an information processing system with license key management for activation of vendor software.

As shown in FIG. 1, process 100 includes an OEM 110, a software vendor 120, an ODM 130 and a customer computer system 140. Recall from the background section above that an OEM is the entity that sells a system, e.g., a computer system, to a customer. Assume the computer system has an operating system from the software vendor pre-installed that must be activated by the software vendor before the customer can use the operating system. By "pre-install," it is illustratively meant that the operating system is installed on the computer system before the computer system is received by the customer. While the OEM can also build the computer system, the OEM can additionally or alternatively have a business relationship with an entity that has manufacturing facilities (e.g., factory) to build the computer system for the OEM and pre-install the operating system obtained from the software vendor, such entity being referred to as an ODM.

Thus, as shown in the set of steps labeled 102, OEM 110 purchases one or more license keys from software vendor 120. License keys typically are data strings (unique with respect to one another) assigned by the software vendor 120 that become respectively associated with copies of the operating system pre-installed on computer systems built by ODM 130 and sold by the OEM 110, e.g. customer computer system 140. By way of example only, a license key may be a 5×5 alpha numeric data string used by software vendor 120 to identify for the software vendor 120 what version and features of the software the compure system is using, e.g., C54BG-BV98D-79GHB-0BIU3-T56YJ. OEM 110 stores the purchased license keys in an inventory management system 112. Then, in the set of steps labeled 104, OEM 110 provides the license keys to ODM 130 for an order (in bulk and part of order). ODM 130 fuses the unique license keys for the copies of the operating systems respectively into the computer systems it builds. For each computer system, ODM 130 generates a "computer build report" (CBR) which includes a service tag (e.g., a system identification alphanumeric value given by OEM 110), the license key, and the product family of the computer system (other identifying information can be included in the CBR), and provides the CBR to OEM 110. In the set of steps 106, OEM 110 provides the CBR for the given computer system to software vendor 120. Assume then that the computer system is purchased by a given customer, i.e., represented as customer computer system 140. As depicted in the set of steps 108, once the customer computer system 140 boots up, the operating system pre-installed thereon calls the software vendor 120 with the service tag. The software vendor 120 checks the corresponding CBR for validity and, if valid, activates the operating system for full functionality.

There are many drawbacks associated with this typical license key management process 100. By way of example only, some drawbacks are: if license keys are not used, they have to be returned by the OEM to the software vendor; a significant amount of money is spent on this process by both the OEM and software vendor; a waste of business operations time to order license keys; a need to forecast how many license keys have to be procured; a multi step key procurement process; in case of mistakes, procured license keys can be lost; overhead of allocation of license keys to ODM and maintainenance of a threshold number of license keys; OEM has to send CBR with service tag to the software vendor; any break in the communications between ODM, OEM and the software vendor will lead to the operating system not being activated when the customer first starts up his newly purchased computer system; reconciliation of license keys leads financial impact to OEM and the software vendor; and risk of theft of license keys.

Figure 2:
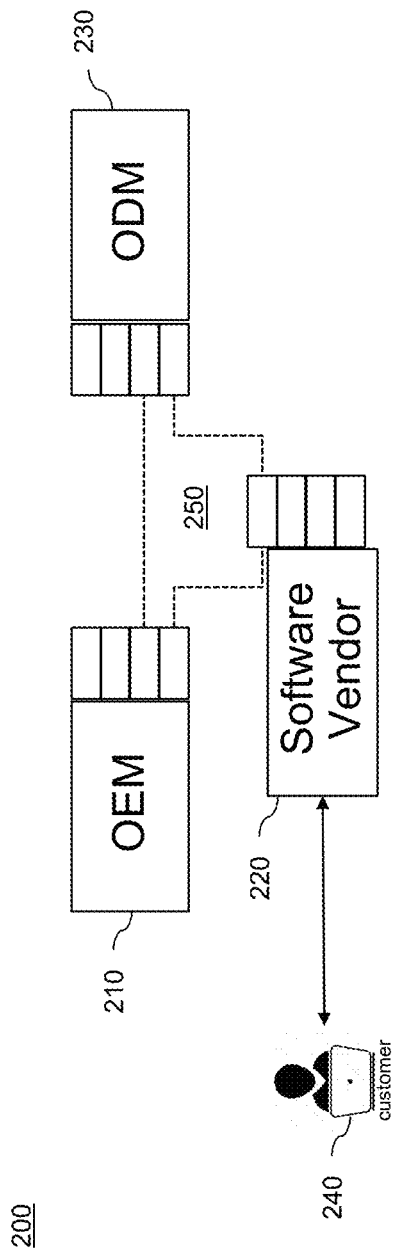
FIG. 2 depicts an information processing system with keyless license activation of vendor software using a distributed ledger, according to an illustrative embodiment.

Illustrative embodiments overcome the above and other drawbacks of the typical license key activation process by providing a keyless license activation process and system that is based on a distributed ledger (e.g., blockchain) protocol. For example, FIG. 2 depicts an information processing system 200 with keyless license activation of vendor software using a distributed ledger, according to an illustrative embodiment.

As shown, system 200 comprises OEM 210, software vendor 220, ODM 230 and customer computer system 240. Generally similar to the relationships described above, OEM 210 sells computer systems (e.g., customer computer system 240), built by ODM 230, with software (e.g., operating system) from software vendor 220 pre-installed thereon but requiring activation at initial boot up. However, rather than utilizing the burdensome and risky license key activation process described above in the context of FIG. 1, OEM 210, software vendor 220 and ODM 230 are part of a distributed ledger system 250, as will be further explained.

As used herein, the terms "distributed ledger," "blockchain" and "digital ledger" may be used interchangeably. A blockchain or distributed ledger protocol is implemented via a distributed, decentralized computer network of computing resources or compute nodes (e.g., OEM 210, software vendor 220 and ODM 230 each maintain at least one compute node that collectively are part of the distributed ledger 250). The compute nodes are operatively coupled in a peer-to-peer communications protocol. In the computer network, each compute node is configured to maintain a blockchain which is a cryptographically secured record or ledger of data blocks that represent respective transactions within a given computational environment (e.g., transactions are events associated with the manufacture of a computer system and activation of software pre-installed on the computer system). The blockchain is secured through use of a cryptographic hash function. A cryptographic hash function is a cryptographic function which takes an input (or message) and returns a fixed-size alpha numeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction (s) and a hash value of the previous block in the chain, i.e., the previous transaction. That is, each block is typically a group of transactions. Thus, advantageously, each data block in the blockchain represents a given set of transaction data plus a set of all previous transaction data. In existing digital ledger technologies such as blockchain, an underlying consensus algorithm is typically used to validate new transactions before they are added to the digital ledger. Typically, for example, the new transaction entry is broadcast to all or a subset of nodes within the network and inspected. The entry is formally committed to the blockchain when consensus is reached by the recipient nodes that the entry is valid. A key principle of the blockchain is that it is trusted. That is, it is critical to know that data in the blockchain has not been tampered with by any of the compute nodes in the network (or any other node or party). For this reason, a cryptographic hash function is used. Each resulting hash value is unique such that if one item of data in the blockchain is altered, the hash value changes. It is to be appreciated that the above description represents an illustrative implementation of the blockchain protocol and that embodiments are not limited to the above or any particular distributed ledger implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

Figure 3:
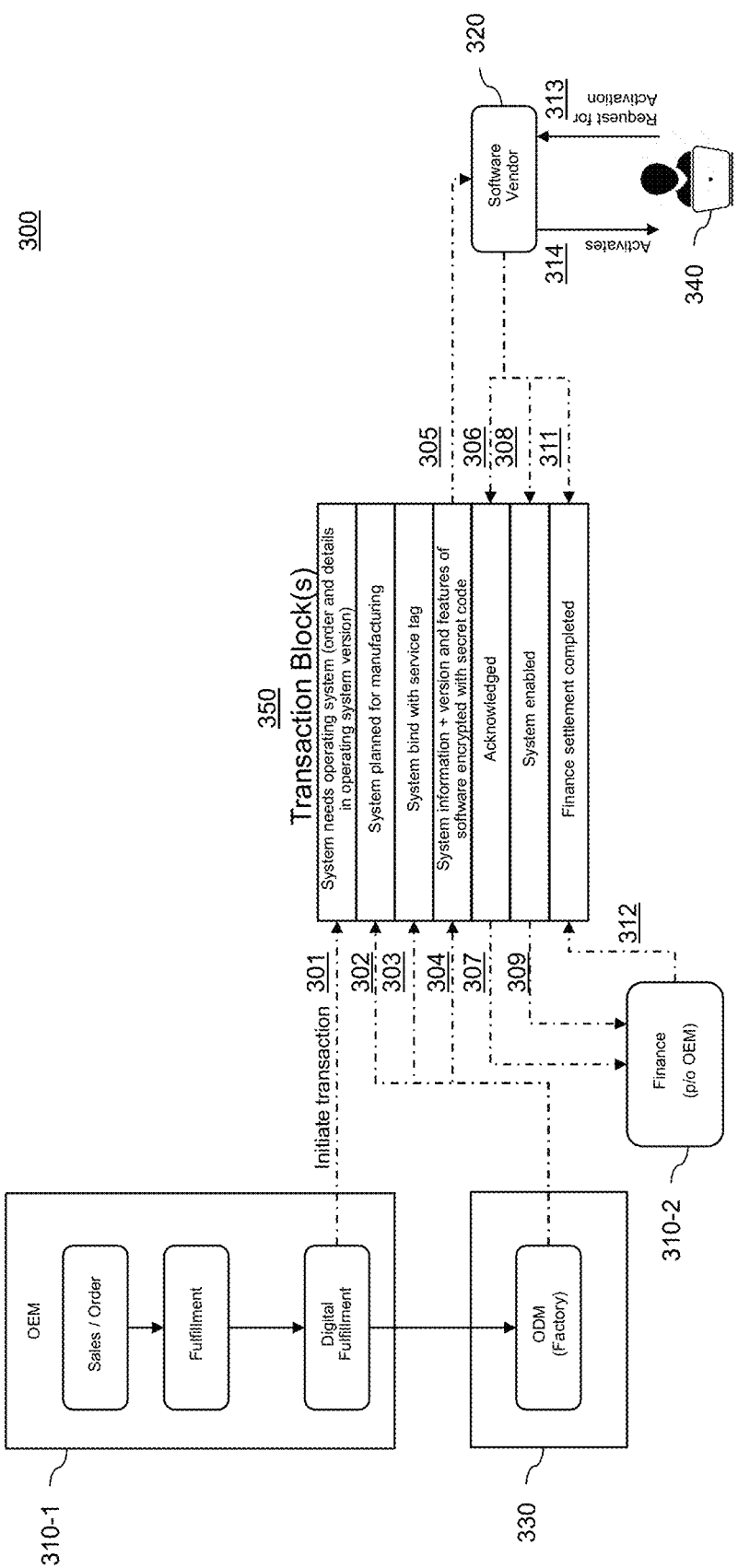
FIG. 3 depicts a methodology for an information processing system with keyless license activation of vendor software using a distributed ledger, according to an illustrative embodiment.

FIG. 3 depicts a methodology 300 for an information processing system with keyless license activation of vendor software using a distributed ledger, according to an illustrative embodiment. As shown, OEM 310 (310-1 and 310-2 collectively), software vendor 320, and ODM 330 are participants on and thus operatively coupled through a distributed ledger system (as illustrated and explained above in the context of FIG. 2) to enable keyless activation of un-activated software pre-installed on customer computer system 340. Transaction block 350 represents an exemplary set of transaction data that is initially created by a participant, and written to and/or read by each participant in the distributed ledger system (OEM 310, software vendor 320, and ODM 330) as various steps in the software pre-installation and activation processes occur. Note that while 350 is depicted as one transaction block in FIG. 3, it is to be appreciated that in some embodiments the data shown in 350 can be stored as multiple transaction blocks in the distributed ledger system (depending on the specific blockchain protocol being employed), wherein a data update from each participant is considered a transaction block. Note also that OEM 310 is illustrated in two parts in FIG. 3, 310-1 represents sales/order and fulfillment functions while 310-2 represents a finance function. Digital fulfillment means that the operating system being ordered by OEM 310 is provided electronically, e.g., downloaded from a secure server of the software vendor 320. However, alternative embodiments can include fulfillment with other delivery mechanisms.

In step 301, OEM 310 initiates creation of the transaction block 350 by specifying the operating system needed for the computer system in the order with an order number and an operating system version.

ODM 330 reads transaction block 350 to obtain the initial information written by OEM 310. ODM 330 installs a trial version of the operating system (e.g., delivered to ODM 330 with one of the delivery mechanisms mentioned above), and creates a file with one or more unique identifiers of the particular computer system being built including, but not limited to, a service tag (e.g., a unique number) assigned to this computer system build, an operating system version, and/or other information (e.g., features of the operating system that are enabled for this particular computer build order) that the software vendor 320 requires for use in activating the un-activated operating system pre-installed on the computer system. It is to be understood that OEM 310, software vendor 320, and ODM 330 can agree ahead of time on the information that is to be included in the file. In one or more illustrative embodiments, pre-agreement as well as the format of information within transaction block 350 can be managed via a smart contract implemented as part of the distributed ledger (blockchain) system. Those of ordinary skill in the art will understand smart contract functionalities and thus such functionalities are not described in further detail herein.

Further, as shown in FIG. 3, ODM 330 writes data to transaction block 350 including data indicating the system planned for manufacturing (step 302) and data that the computer system is bound with the service tag (step 303). Note that, in alternative embodiments, one or more other steps of the manufacturing process (not expressly shown) can be captured in transaction data stored in transaction block 350.

ODM 330 then encrypts the file containing the above-mentioned unique identifiers using a secret code (i.e., a private value). In one or more illustrative embodiments, the secret code comprises a combination of unique identifiers including the service tag (e.g., a system identification alphanumeric value given by OEM 310), a serial number of the computer system (e.g., a serial number is a system identification number given by ODM 330), and a piece part identifier (PPID) of the motherboard in the computer system. However, other private values (e.g., private keys) can be used for encrypting the file. Use of a private value (key) to encrypt a file is known to those of ordinary skill in the art and thus is not described in further detail herein.

ODM 330 in step 304 updates transaction block 350 with the encrypted file along with the plaintext (non-encrypted) service tag. At least a portion of this transaction data provided by ODM 330 in step 304 (e.g., the plaintext service tag) serves to inform the software vendor 320 which version and which functions are to be enabled for the customer computer system 340. The information in the file is unreadable by any entity that does not have or cannot itself regenerate the secret code. Note that the term encrypted file is an exemplary term for what may otherwise be referred to herein as a "data object."

In step 305, software vendor 320 can obtain the encrypted file along with the plaintext service tag (as well as obtaining other encrypted files and corresponding service tags created in a similar manner for other computer systems being manufactured with its operating system pre-installed), and writes an acknowledgment to the transaction block 350 in step 306. OEM 310 (310-2) reads the acknowledgement in step 307. In step 308, software vendor 320 records enablement of the operating system for the OEM 310 (read by OEM 310-2 in step 309), and finance settlement is completed between OEM 310 and software vendor 320 and recorded in transaction block 350 in steps 311 and 312.

Assume now that the customer purchases the computer system 340 from OEM 310 and boots the system up for the first time. In step 313, customer computer system 340 calls the software vendor 320 (e.g., through an application programming interface (API) over a public communication network such as the Internet). The customer computer system 340 provides the plaintext service tag and the secret code to software vendor 320. Note that the plaintext service tag is stored on the computer system 340 by ODM 330 during manufacturing. However, the computer system 340 is also configured to generate the secret code from information stored or retrievable from within the computer system 340, i.e., the plaintext service tag, the serial number of the computer system, and the PPID of the motherboard in the computer system 340.

Software vendor 320 can read transaction block 350 to obtain the encrypted file (if it has not already done so in step 305 mentioned above) using the service tag as a look up indicator. It is to be appreciated that the distributed ledger system stores information as explained herein for a plurality of manufactured computer systems and thus the service tag serves as a look up indicator to obtain the corresponding encrypted file. The software vendor 320 identifies the encrypted file using the service tag and attempts to decrypt the encrypted file using the secret code sent by customer computer system 340 in its activation request (step 313). If the secret code received from customer computer system 340 successfully decrypts the encrypted file, then this is confirmation that customer computer system 340 is a valid system and thus software vendor 320 activates (step 314) the operating system in customer computer system 340 for full functionality. Software vendor 320 can then update transaction block 350.

Figure 4:
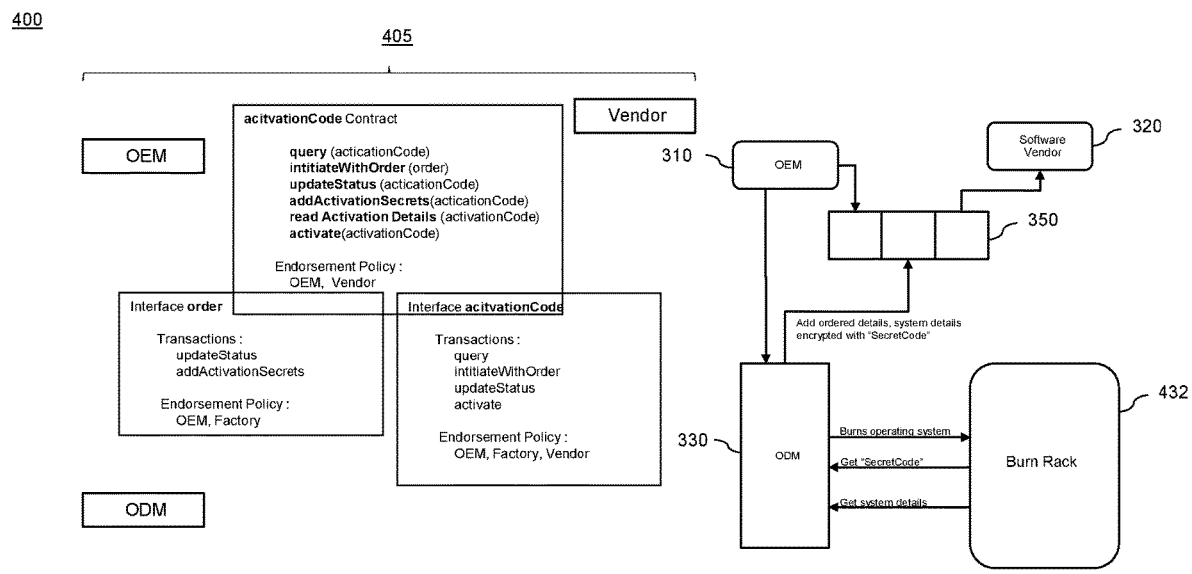
FIG. 4 depicts further details of an information processing system with keyless license activation of vendor software using a distributed ledger, according to an illustrative embodiment.

FIG. 4 depicts further exemplary details 400 of methodology 300. More particularly, exemplary code segments 405 employed by one or more of the participants (OEM 310, software vendor 320 and ODM 330) to read from/write to transaction block 350 are shown, while ODM operations to "burn rack" or manufacture computer system 340 are depicted in 432.

The particular processing operations and other system functionality described in conjunction with FIGS. 3 and 4 and elsewhere herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

Advantageously, illustrative embodiments remove any dependency on license keys from the software activation process. Furthermore, illustrative embodiment eliminate procurement, inventory management, return of unused license keys, and license key fusing from the software activation process, all while adding improved security and convenience for the participants.

Figure 5:
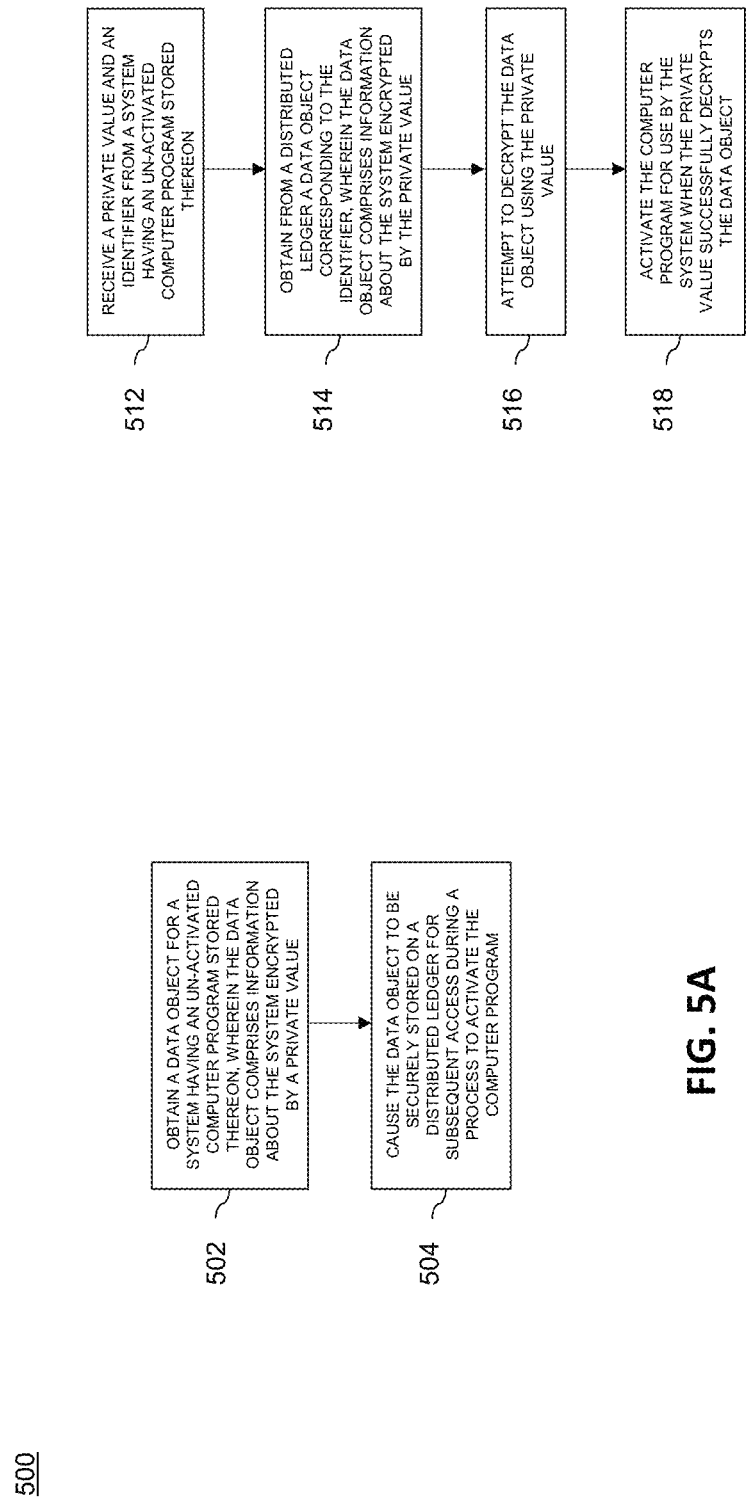
FIGS. 5A and 5B depict one or more methodologies for an information processing system with keyless license activation of vendor software using a distributed ledger, according to an illustrative embodiment.

FIGS. 5A and 5B depict one or more methodologies 500 for an information processing system with keyless license activation of vendor software using a distributed ledger, according to an illustrative embodiment.

For example, in step 502 of FIG. 5A, a data object is obtained for a system having an un-activated computer program stored thereon. The data object comprises information about the system encrypted by a private value. The method, in step 504, then causes the data object to be securely stored on a distributed ledger for subsequent access during a process to activate the computer program. By way of example only, this method can be performed by an OEM and/or an ODM.

By way of further example, in step 512 of FIG. 5B, a private value and an identifier are received from a system having an un-activated computer program stored thereon. In step 514, a data object corresponding to the identifier is obtained from a distributed ledger. The data object comprises information about the system encrypted by the private value. Step 516 attempts to decrypt the data object using the private value, and step 518 activates the computer program for use by the system when the private value successfully decrypts the data object. By way of example only, this method can be performed by a third party software provider or vendor.

Figure 6:
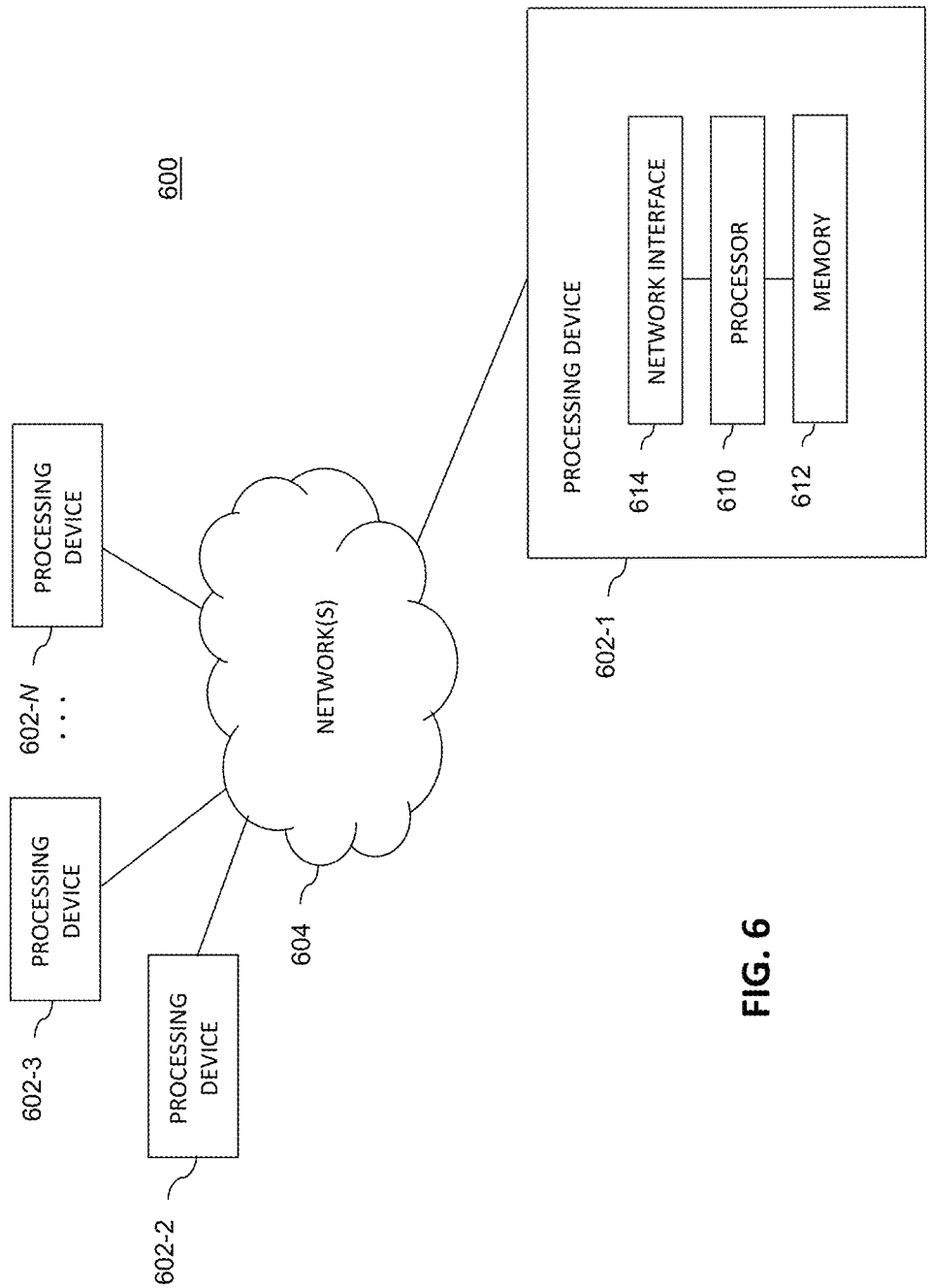
FIG. 6 depicts a processing platform used to implement an information processing system with keyless license activation of vendor software using a distributed ledger, according to an illustrative embodiment.

FIG. 6 depicts a processing platform 600 used to implement an information processing system with keyless license activation of vendor software using a distributed ledger, according to an illustrative embodiment. More particularly, processing platform 600 is a processing platform on which a computing environment with functionalities described herein (e.g., FIGS. 1-5 and otherwise described herein) can be implemented.

The processing platform 600 in this embodiment comprises a plurality of processing devices, denoted 602-1, 602-2, 602-3, . . . 602-N, which communicate with one another over network(s) 604. It is to be appreciated that the methodologies described herein may be executed in one such processing device 602, or executed in a distributed manner across two or more such processing devices 602. It is to be further appreciated that a server, a client device, a computing device or any other processing platform element may be viewed as an example of what is more generally referred to herein as a "processing device." As illustrated in FIG. 6, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 602 shown in FIG. 6. The network(s) 604 represent one or more communications networks that enable components to communicate and to transfer data therebetween, as well as to perform other functionalities described herein.

The processing device 602-1 in the processing platform 600 comprises a processor 610 coupled to a memory 612. The processor 610 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 610. Memory 612 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 612 may comprise electronic memory such as random-access memory (RAM), read-only memory (ROM) or other types of memory, in any combination. The one or more software programs when executed by a processing device such as the processing device 602-1 causes the device to perform functions associated with one or more of the components/steps of system/methodologies in FIGS. 1-5. One skilled in the art would be readily able to implement such software given the teachings provided herein. Other examples of processor-readable storage media embodying embodiments of the invention may include, for example, optical or magnetic disks.

Processing device 602-1 also includes network interface circuitry 614, which is used to interface the device with the networks 604 and other system components. Such circuitry may comprise conventional transceivers of a type well known in the art.

The other processing devices 602 (602-2, 602-3, . . . 602-N) of the processing platform 600 are assumed to be configured in a manner similar to that shown for computing device 602-1 in the figure.

The processing platform 600 shown in FIG. 6 may comprise additional known components such as batch processing systems, parallel processing systems, physical machines, virtual machines, virtual switches, storage volumes, etc. Again, the particular processing platform shown in this figure is presented by way of example only, and the system shown as 600 in FIG. 6 may include additional or alternative processing platforms, as well as numerous distinct processing platforms in any combination.

Also, numerous other arrangements of servers, clients, computers, storage devices or other components are possible in processing platform 600. Such components can communicate with other elements of the processing platform 600 over any type of network, such as a wide area network (WAN), a local area network (LAN), a satellite network, a telephone or cable network, or various portions or combinations of these and other types of networks.

Furthermore, it is to be appreciated that the processing platform 600 of FIG. 6 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 600 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers. As illustratively used herein, a container is considered a "virtual computing element" (e.g., unit of software) that packages application code and its dependencies so that the application is executed quickly and reliably from one computing environment to another. A Docker container image is a lightweight, standalone, executable package of software that includes all components needed to execute an application.

The particular processing operations and other system functionality described in conjunction with FIGS. 1-6 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. A method comprising:
receiving a private value and an identifier from a system having an un-activated computer program stored thereon;

obtaining from a distributed ledger a data object corresponding to the identifier, wherein the data object comprises information about the system encrypted by the private value;

attempting to decrypt the data object using the private value; and activating the un-activated computer program for use by the system when the private value successfully decrypts the data object;

wherein the steps are performed by a processing device comprising a processor operatively coupled to a memory.

2. The method of claim 1, wherein the identifier is a service tag for the system.

3. The method of claim 1, wherein the private value is a hash value created from a set of unique identifiers of the system.

4. The method of claim 3, wherein the set of unique identifiers of the system comprises a serial number of the system, a service tag for the system, and an identifier of a component in the system.

5. The method of claim 4, wherein the identifier of a component in the system is an identifier of a motherboard installed in the system.

6. The method of claim 1, wherein the distributed ledger is a blockchain network and the data object is at least part of a transaction block.

7. The method of claim 1, wherein the un-activated computer program is an operating system.

8. An article of manufacture comprising a non-transitory processor-readable storage medium having stored therein program code of one or more software programs, wherein the program code when executed by a processing device causes the processing device to:

receive a private value and an identifier from a system having an un-activated computer program stored thereon;

obtain from a distributed ledger a data object corresponding to the identifier, wherein the data object comprises information about the system encrypted by the private value;

attempt to decrypt the data object using the private value; and activate the un-activated computer program for use by the system when the private value successfully decrypts the data object.

9. The article of claim 8, wherein the identifier is a service tag for the system.

10. The article of claim 8, wherein the private value is a hash value created from a set of unique identifiers of the system.

11. The article of claim 10, wherein the set of unique identifiers of the system comprises a serial number of the system, a service tag for the system, and an identifier of a component in the system.

12. The article of claim 11, wherein the identifier of a component in the system is an identifier of a motherboard installed in the system.

13. The article of claim 8, wherein the distributed ledger is a blockchain network and the data object is at least part of a transaction block.

14. The article of claim 8, wherein the un-activated computer program is an operating system.

15. An apparatus comprising:

at least one processing device comprising a processor coupled to a memory, the at least one processing device, when executing program code, is configured to:

receive a private value and an identifier from a system having an un-activated computer program stored thereon;

obtain from a distributed ledger a data object corresponding to the identifier, wherein the data object comprises information about the system encrypted by the private value;

attempt to decrypt the data object using the private value; and activate the un-activated computer program for use by the system when the private value successfully decrypts the data object.

16. The apparatus of claim 15, wherein the identifier is a service tag for the system.

17. The apparatus of claim 15, wherein the private value is a hash value created from a set of unique identifiers of the system.

18. The apparatus of claim 17, wherein the set of unique identifiers of the system comprises a serial number of the system, a service tag for the system, and an identifier of a component in the system.

19. The apparatus of claim 15, wherein the distributed ledger is a blockchain network and the data object is at least part of a transaction block.

20. The apparatus of claim 15, wherein the un-activated computer program is an operating system.

\* \* \* \* \*